United States Patent Office 2,875,120

Patented Feb. 24, 1959

1

2,875,120

INSECTICIDE FORMULATIONS

Leo Trademan, Marshall A. Malina, and Louis P. Wilks, Chicago, Ill., assignors to Velsicol Chemical Corporation, a corporation of Illinois No Drawing. Application November 5, 1954
Serial No. 467,204

4 Claims. (Cl. 167—30)

This invention relates to insecticide compositions and to methods of stabilizing them. More particularly, the present invention relates to dry formulations of certain halogenated insecticides stabilized with a combination of sodium hydroxide and organic compounds containing two hydroxyl groups.

Dry formulations of halogenated insecticides fall into three main classifications, namely, dusts, wettable powders, and granular formulations. Dusts and granular formulations differ primarily in particle size of the carrier or diluent used. For example, a typical dust formulation may comprise an insecticide dispersed in a solid carrier having a particle size smaller than about 325 mesh. A typical granular formulation would comprise an insecticide dispersed in a solid pulverulent carrier having a particle size of about 20–80 mesh. A typical wettable powder comprises an insecticide and a solid pulverulent carrier having a particle size of the order of that used for dust formulations, in conjunction with wetting and dispersing agents.

Typically, a granular formulation may contain from about 1% to about 35% insecticide. This type of formulation is generally used as such without further dilution with an insecticidally inert pulverulent carrier in such fields as agriculture.

Typically, a dust formulation can contain about 0.25% insecticide up to about 50% insecticide. Frequently, the dust formulations are first prepared as so-called "concentrates" which contain typically from about 10% to about 50% insecticide dispersed in the dust and such "concentrate" is further diluted to a so-called "field strength" dust typically having an insecticide concentration of about 0.25% to about 5%, varying with the use desired and the potency of the insect toxicant.

The wettable powders typically contain a concentration of toxicant on the order of that contained in dust concentrates as above described. However, these wettable powders are diluted to "field strength" by dispersing in water rather than by further dilution with dust.

The toxicant ingredient of the dry insecticide formulations which is stabilized by the present invention is selected from that class of insect toxicants which are derived from hexachlorocyclopentadiene and which are specifically typified by chlordane, heptachlor, aldrin, isodrin, dieldrin, or endrin, either in their pure or technical form.

The carriers or diluents generally used with these insect toxicants, and which in their normal state are active in deteriorating the aforesaid class of toxicants when mixed therewith without treatment as specified in the present invention, are pulverulent solids of the class consisting of kaolin clays, montmorillonite clays, attapulgite clays, diatomaceous earths, and vermiculites.

2

Kaolins such as kaolinite, dickite, nacrite, anauxite, halloysite, and endellite are useful as carrier materials. Montmorillonites, such as beidellite, nontronite, montmorillonite, hectorite, saponite, sauconite and bentonite are useful as carrier materials. Attapulgites such as fuller's earth, attapulgite, and sepiolite are useful as carrier materials. Diatomaceous earths such as diatomite and kieselguhr are useful as carrier materials. Vermiculites such as biotite are useful as carrier materials.

Having now described the types of formulations herein concerned, the insect toxicants employed, and the carriers and diluents used, a brief discussion of the problem encountered in such formulations will be helpful in understanding the present invention.

While the solid carriers above discussed are very useful in formulating the herein defined toxicants for reasons of their inexpensiveness, availability, ease of handling, absorbency characteristics, durability and other desirable physical properties, they have the disadvantageous property, to varying degrees, of degrading or decomposing the insect toxicant when intimately mixed therewith. While this degrading action is a slow process, it is significant and troublesome, since dry formulations are often prepared as concentrates or even field strength materials and then stored for periods which may be as long as a year or more. During this storage period the effect of the carrier or diluent on the insect toxicant may reduce its effectiveness to the point where satisfactory insect control under field conditions is no longer obtainable.

The nature of the reaction or effect of the carriers on the chlorinated insecticide has never been fully elucidated. The rate of toxicant deterioration may vary by the action of different carriers or diluents.

To solve the present problem it has been found necessary to neutralize the activity of the solid carriers and diluents so that they are inert to the insect toxicant and will allow protracted storage of dry insecticide formulations without deterioration of insecticidal activity of such formulation.

Since the formulations herein concerned are used preponderantly in agriculture, any treatment of the carriers and diluents used must necessarily not render the formulation unfit for agricultural use on food and forage crops at time of harvest. Thus, the treatment must not render the formulation phytotoxic. The treatment must likewise not be hazardous from a warm-blooded animal toxicity standpoint or otherwise increase the hazard in the utilization of insecticide formulations. Also of primary importance, and considering the economics involved, the material should be relatively inexpensive and readily incorporated into dry insecticidal formulations.

As described and claimed in our copending patent application, Serial No. 461,036, filed October 7, 1954, the addition of glycol material selected from the class ethylene glycol, diethylene glycol, propylene glycol, and triethylene glycol to the carriers herein defined has the beneficial effect of alleviating or eliminating degradation or deterioration of the herein defined insect toxicant ingredient in dry insecticide formulations. The present application is a continuation-in-part of the aforesaid copending application.

The present invention involves the stabilization of the dry insecticidal formulations herein defined by incorporating therein both the glycol disclosed in the aforesaid copending application and sodium hydroxide. The unexpected beneficial result from the use of sodium hydroxide in combination with the said glycol is that by such use equivalent stabilization of formulations is achieved with smaller amounts of said glycol as compared with the use of said glycol alone. Thus, by use of the combination of glycol and sodium hydroxide, not only is the amount of glycol used minimized, but also the total amount of material added to the carrier for stabilizing purposes is likewise diminished and minimized. The replacement of part of the glycol material by sodium hydroxide in the formulations has no adverse effect on the performance of said insecticidal formulations when applied under field conditions.

While the glycol material herein defined will effect stabilization of the formulations by itself, sodium hydroxide will not work by itself. It is thus surprising that sodium hydroxide can be used to replace substantial proportions of glycol used as stabilizer while achieving equivalent stabilization results. Actually, on a weight basis, the caustic soda can replace more than its weight of glycol without deleterious effect on the stability of the final formulation. The benefit of such replacement of glycol with sodium hydroxide without diminution of beneficial result is immediately apparent when it is considered that caustic soda costs only a fraction of the glycols defined.

It has been found that as much as 66% of glycol heretofore used by itself as a stabilizing agent can be replaced with less than an equal weight of sodium hydroxide without loss of effectiveness. Thus, the present invention contemplates the use of glycol and caustic soda in a proportion of from about 20% to about 70% of sodium hydroxide to from about 30% to about 80% of a glycol selected from the group consisting of ethylene glycol, diethylene glycol, propylene glycol and triethylene glycol.

The glycol and sodium hydroxide additives of the present invention have the beneficial effect of alleviating or eliminating degradation or deterioration of the insect toxicant ingredient in dry insecticide formulatons when contained in such formulations in combined amounts varying between about ½% to about 12% by weight based on the weight of carrier or diluent contained in the formulation. A preferred concentration is about 2% to about 8% on the same basis.

Specifically exemplifying the benefits of the present invention, where 7% of diethylene glycol was used to achieve a stable formulation on a particular carrier, it is, by the practice of the present invention, possible to use as little as 3% diethylene glycol along with 2% to 3% sodium hydroxide.

The art of blending materials with solid carriers is well known and the additives of the present invention can be blended with these solid materials by any known means. For example, the use of commercial type mixers or blenders is adequate.

Preferably, the caustic soda is combined with the glycol material in aqueous solution and the two-component stabilizer is then added in one operation. Alternatively, these two components can be added individually in any sequence. When added individually, the glycol component can be added to and blended with the solid carriers either alone or in combination with an inert, relatively volatile solvent which can be removed after blending. The caustic soda ingredient, when added individually, is preferably added as a water solution such as one of about 30% to 40% concentration.

The two-component stabilizer additive can be added to the solid carriers prior to blending the insect toxicant therewith. In the alternative, the glycol additives can be added to the solid carriers during the same blending operation wherein mixing of the insect toxicant and carrier is achieved. It is preferred to preblend the two-component additive to the carrier before blending the insect toxicant.

The stabilizing effect of the glycols herein described, when used alone, has already been shown and discussed in the aforesaid copending application. The following shows additional data indicating the benefit of the use of caustic soda along with said glycol material:

*Table*

[Amounts expressed in weight percent]

| Formulation | Stabilizer | | Heptachlor | Carrier |
|---|---|---|---|---|
| | Diethylene Glycol | NaOH | | |
| A | 2.67 | -------- | 10.7 | 87.63 (Kaolin). |
| B | 0.89 | 0.67 | 10.5 | 87.94 (Kaolin). |
| C | 6.22 | -------- | 11.2 | 82.58 (Attapulgite). |
| D | 3.56 | 1.77 | 11.1 | 83.57 (Attapulgite). |
| E | 2.66 | 2.66 | 11.1 | 83.57 (Attapulgite). |
| F | 4.5 | -------- | 10.2 | 85.3 (Diatomaceous Earth). |
| G | 1.8 | 1.35 | 10.2 | 86.65 (Diatomaceous Earth). |

Formulations containing the components as stated in the above table were subjected to accelerated storage tests in an oven maintained at 122° F. After thirty days of such storage the heptachlor content of each such formulation remained unchanged and degradation had not taken place. On the other hand, formulations such as B, D, E, and G, containing an equal level of glycol but without any sodium hydroxide, are not stable when subjected to accelerated storage conditions as defined. While the stability of such formulations as B, D, E, and G in the absence of caustic soda but in the presence of the indicated level of glycol is greater than the same formulations without any stabilizer, such formulations containing lower levels of glycol material are not as stable as the formulations containing the same low level of glycol material supplemented by the indicated levels of caustic.

While the glycol indicated in the table is diethylene glycol, the other glycols, namely, ethylene glycol, triethylene glycol and propylene glycol are similar in their stabilizing action both alone and when used in conjunction with caustic soda.

Similarly, while the data in the table was accumulated using heptachlor as insect toxicant, the other hexachlorocyclopentadiene derived insect toxicants are likewise benefited by the treatment of the present invention.

The above results show that a glycol-caustic soda combination is as effective as glycol alone in substantially eliminating decomposition of dry insecticidal formulations. The use of the caustic soda-glycol combination as stabilizer is unusually economical and represents a reduction of from 45% to about 60% on the cost of stabilization by glycol alone.

It is to be noted that the total amount of glycol-caustic combination necessary to produce stability is somewhat less than the amount of glycol alone and apparently is due either to a synergistic effect or by adjuvant action of the sodium hydroxide.

We claim:

1. A stabilized insecticidal composition comprising in combination: an insect toxicant derived from hexachlorocyclopentadiene selected from the group consisting of endrin, isodrin, aldrin, dieldrin, chlordane and heptachlor; a finely divided solid carrier active in deteriorating said insect toxicant mixed therewith selected from the group consisting of kaolin clay, montmorillonite clay, attapulgite clay, diatomaceous earth and vermiculite; and between ½% and 12% by weight of the carrier of a combination which alleviates said deterioration of the insect toxicant consisting of from about 30% to about 80% by weight of a glycol selected from the group consisting of ethylene glycol, propylene glycol, diethylene glycol and triethylene glycol; and from about 20% to about 70% by weight of sodium hydroxide.

2. A stabilized insecticidal composition comprising in combination: heptachlor; a finely divided solid carrier active in deteriorating said insect toxicant mixed therewith selected from the group consisting of kaolin clay, montmorillonite clay, attapulgite clay, diatomaceous earth and vermiculite; and between ½% and 12% by weight of the carrier of a combination which alleviates said deterioration of the insect toxicant consisting of from about 30% to about 80% by weight of a glycol selected from the group consisting of ethylene glycol, propylene glycol, diethylene glycol, and triethylene glycol; and from about 20% to about 70% by weight of sodium hydroxide.

3. A stabilized insecticidal composition comprising in combination: endrin; a finely divided solid carrier active in deteriorating said insect toxicant mixed therewith selected from the group consisting of kaolin clay, montmorillonite clay, attapulgite clay, diatomaceous earth and vermiculite; and between ½% and 12% by weight of the carrier of a combination which alleviates said deterioration of the insect toxicant consisting of from about 30% to about 80% by weight of a glycol selected from the group consisting of ethylene glycol, propylene glycol, diethylene glycol, and triethylene glycol; and from about 20% to about 70% by weight of sodium hydroxide.

4. A stabilized insecticidal composition comprising in combination: chlordane; a finely divided solid carrier active in deteriorating said insect toxicant mixed therewith selected from the group consisting of kaolin clay, montmorillonite clay, attapulgite clay, diatomaceous earth and vermiculite; and between ½% and 12% by weight of the carrier of a combination which alleviates said deterioration of the insect toxicant consisting of from about 30% to about 80% by weight of a glycol selected from the group consisting of ethylene glycol, propylene glycol, diethylene glycol, and triethylene glycol; and from about 20% to about 70% by weight of sodium hydroxide.

References Cited in the file of this patent

UNITED STATES PATENTS

| | | |
|---|---|---|
| 2,371,644 | Petering | Mar. 20, 1945 |
| 2,407,149 | Gardenier | Sept. 3, 1946 |
| 2,722,557 | Danison | Nov. 1, 1955 |
| 2,768,181 | Bellin et al. | Oct. 23, 1956 |

OTHER REFERENCES

Watkins: Handbook of Insecticide Dust Diluents and Carriers, Dorland Books (1955), pp. 57–70, 96–100, 161–200, 136–160 and 200–214.

Roark: USDA Pub. E–817, April 1951, A Digest of Info. on Chlordane, (pp. 8 and 11 pert.).

Rogoff et al.: J. Econ. Entom., vol. 44, No. 6, December 1951, pp. 910–918 (pp. 912–913 pert.).

Daviaud et al.: Phytiat.-Phytopharm. No. 3, pp. 29–34, 1952; thru Chem. Abstrs., vol. 48, 1954, p. 11710.